United States Patent
Shelton

[11] Patent Number: 5,265,905
[45] Date of Patent: Nov. 30, 1993

[54] AIR BAG COVER HORN BLOW SWITCH ASSEMBLY

[75] Inventor: Darryl A. Shelton, Edgewater, N.J.

[73] Assignee: Ford Motor Company, Dearborn, Mich.

[21] Appl. No.: 1,602

[22] Filed: Jan. 7, 1993

[51] Int. Cl.[5] .................................... B60R 21/08
[52] U.S. Cl. ................................ 280/731; 280/743
[58] Field of Search ................ 280/731, 743, 728

[56] References Cited

U.S. PATENT DOCUMENTS

| | | |
|---|---|---|
| 2,181,728 | 11/1939 | Greentree . |
| 3,699,294 | 10/1972 | Sudduth . |
| 3,819,205 | 6/1974 | Dunford et al. . |
| 3,945,665 | 3/1976 | Tsutsumi et al. . |
| 4,080,519 | 3/1978 | Michalson . |
| 4,228,115 | 10/1980 | Gardner et al. . |
| 4,325,568 | 4/1982 | Clark et al. . |
| 4,374,310 | 2/1983 | Kato et al. . |
| 4,575,117 | 3/1986 | Uchida . |
| 4,594,484 | 6/1986 | Lemmer et al. . |
| 4,602,135 | 7/1986 | Phalen . |
| 4,612,425 | 9/1986 | Kanai et al. . |
| 4,714,806 | 12/1987 | Inui et al. . |
| 4,771,147 | 9/1988 | Buma . |
| 4,785,144 | 11/1988 | Fosnaugh et al. . |
| 4,789,763 | 12/1988 | Nagata et al. . |
| 4,804,857 | 2/1989 | Hayashi et al. . |
| 4,882,460 | 11/1989 | Mertens . |
| 4,934,735 | 6/1990 | Embach . |
| 5,036,169 | 7/1991 | Sakane . |
| 5,062,661 | 11/1991 | Winget ............... 280/731 |
| 5,186,490 | 2/1993 | Adams et al. ......... 280/731 |

Primary Examiner—Joseph D. Pape
Attorney, Agent, or Firm—Daniel M. Stock; Roger L. May

[57] ABSTRACT

An airbag cover with horn blow switch includes an inner cover, a horn switch, a guide for holding the horn switch and an outer cover covering the guide and the horn switch so that when the outer cover is depressed the horn switch is closed and the horn will sound.

11 Claims, 2 Drawing Sheets

AIR BAG COVER HORN BLOW SWITCH ASSEMBLY

BACKGROUND OF THE INVENTION

The present invention relates generally to an airbag assembly or module housed in the center of an automobile steering wheel and more specifically to an assembly for mounting a horn switch in the cover of such a module.

Traditionally, automobile horns have been located primarily in the center of the steering wheel, however the most effective location for an airbag is also in the center of the steering wheel. As a result, horn switches were moved to the spokes of the steering wheel. It is deemed to be desirable to have both the horn switch and airbag module in the center of the steering wheel. One example which the horn and airbag were both in the center of the steering wheel is U.S. Pat. No. 4,785,144 which describes an inflatable restraint module which when depressed, closes a switch behind the restraint module. The apparatus allows easy serviceability of the inflatable restraint module, but if the horn switch needs servicing, the steering wheel must be removed. In other examples the airbag module and horn switch are one unit. These modules are time consuming and costly to service because if the inexpensive horn switch needs servicing, the entire expensive airbag module must be replaced.

It would be desirable to have a horn switch integrated into the airbag cover which is easily removable for servicing or replacing.

SUMMARY OF THE INVENTION

It is therefore an object of the present invention to provide a horn switch integrated with an airbag cover configured for efficiently assembling and replacing the switch.

Briefly, a preferred embodiment of the present invention includes an airbag, an airbag inflator, an inner cover holding the airbag between the inner cover and the airbag inflator, an outer cover covering the inner cover and a pocket between the inner cover and the outer cover holding a horn switch having relatively displaceable contact portions whereby the contacts are displaced to close the horn switch when a force is applied to the outer cover.

An advantage of the present invention is that the horn switch is demountably attached without the use of fasteners so that the horn switch can be replaced in a relatively short period of time without having to replace the entire airbag module assembly.

DETAILED DESCRIPTION OF THE DRAWINGS

Figure 1:
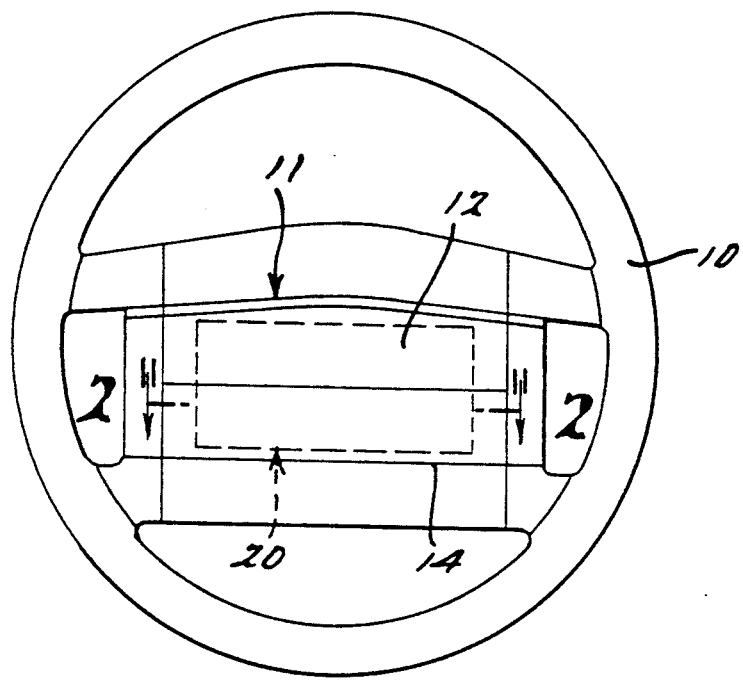
FIG. 1 is a front view of a steering wheel with an airbag cover housing a horn switch.
Figure 2:
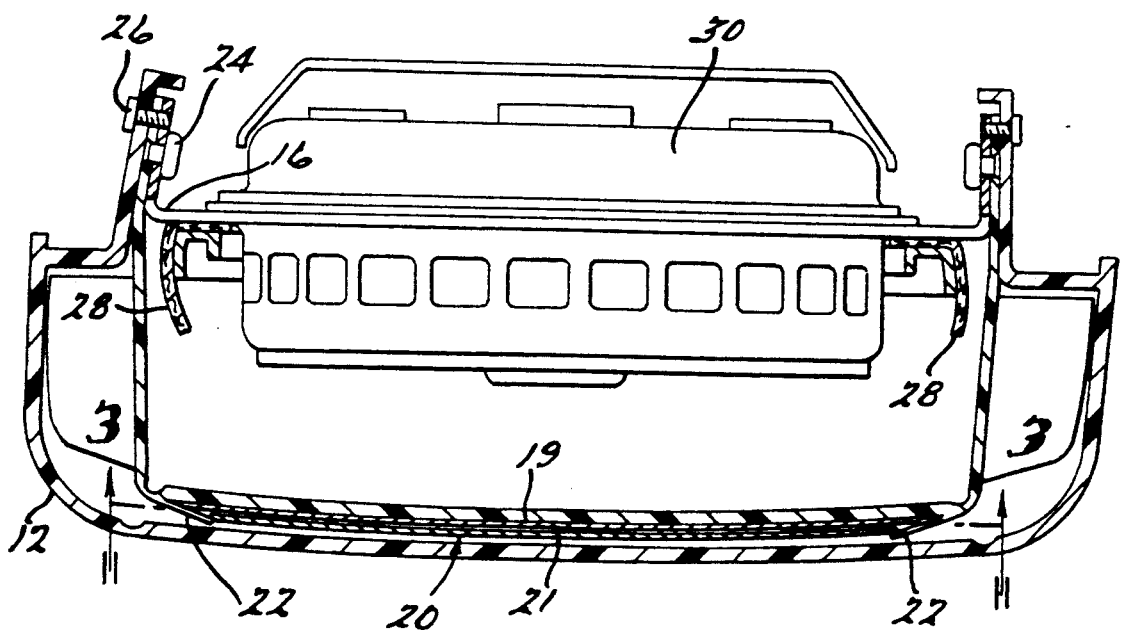
FIG. 2 is a cross sectional view taken along line 2—2 of FIG. 1.

Referring now to FIGS. 1 and 2, a steering wheel assembly has a steering wheel 10 and an airbag assembly 11. Airbag assembly 11 includes an outer cover 12 having a deployment seam 14 on its surface which opens to allow deployment of the enclosed airbag (partially shown at 28). A horn switch 20 is housed between outer cover 12 and an inner cover 18. An airbag 28 and an airbag inflator 30 are housed behind inner cover 18.

Referring now to FIG. 2, the airbag 28 and airbag inflator 30 are enclosed by inner cover 18. Inner cover 18 is made of a thin plastic material such as tetrapolyethelyne. Inner cover 18 is preferably attached to the airbag module backing plate 16 of steering wheel 10 by permanent attachment means such as a rivet 24.

Outer cover 12 is detachably mounted to inner cover 18 by a conventional releasable fastening means such a screw 26 so that a cavity is formed between it and inner cover 18. Outer cover 12 is made of a resilient material for instance a plastic such as DuPont DYM 100, so that it will return to its original shape after applied force is removed.

Horn switch 20 is housed in the cavity between inner cover 18 and outer cover 12. Horn switch 20 can be a conventional type switch such as a blade type switch having two flexible contacts such as metallic plates 19 and 21 which remain spaced apart except when a sufficient amount of force is applied to one contact thereby moving it into contact with the other contact. Horn switch 20 is held to inner cover 18 by tabs 22.

Figure 3:
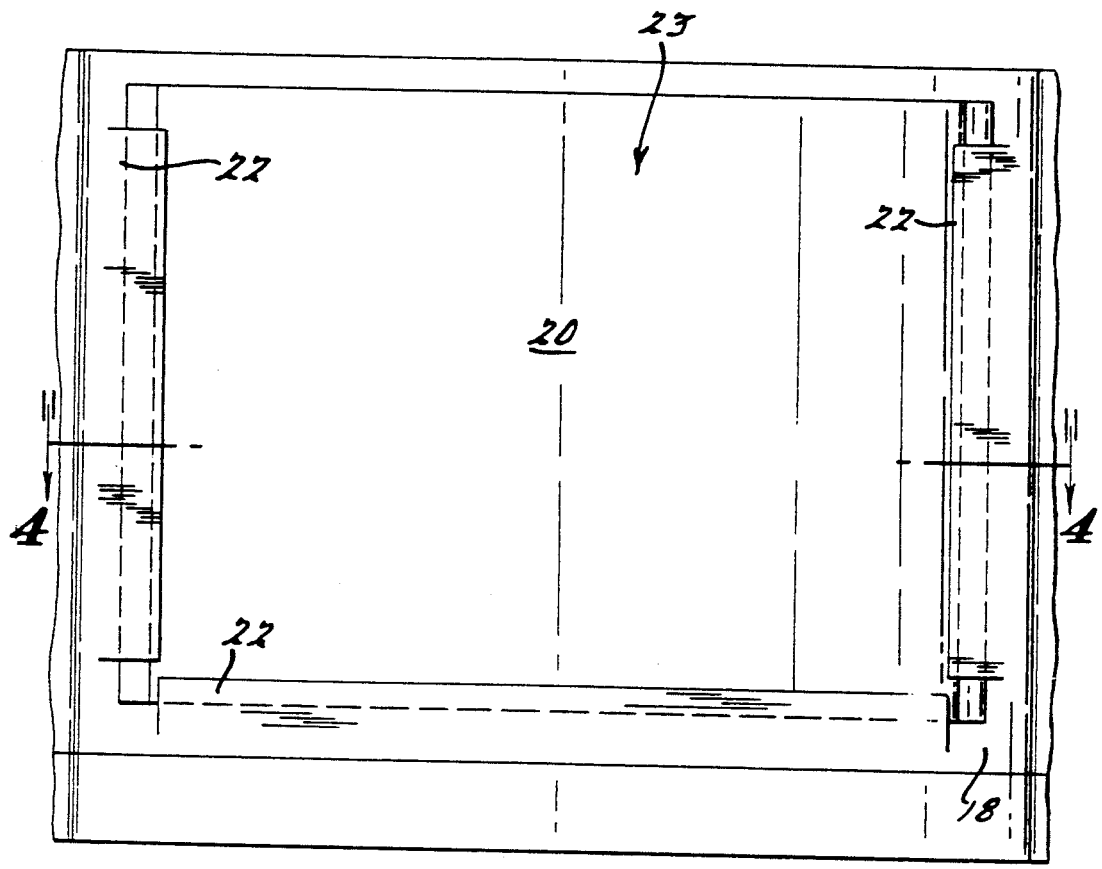
FIG. 3 is a front view of a the horn switch and the inner airbag cover with the outer cover removed.
Figure 4:
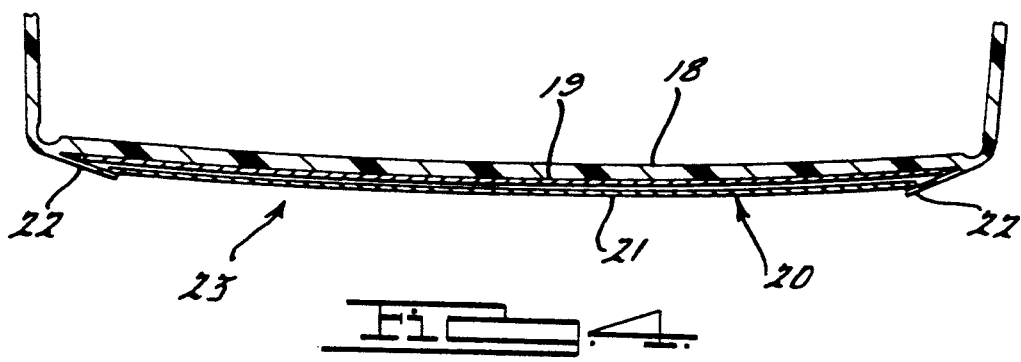
FIG. 4 is a cross sectional view taken along line of 4—4 of FIG. 3.

Referring now to FIGS. 3 and 4, inner cover 18 has tabs 22 which define a pocket 23 to hold horn switch 20 to inner cover 18. Tabs 22 can be separate components or preferably can be molded as an integral part of inner cover 18. Tabs 22 are cantilevered or L-shaped so that they are not in the same plane as inner cover 18 and placed preferably defining three sides of a rectangle. Horn switch 20 is slipped between tabs 22 on either side of inner cover 18. An interference fit holds horn switch 20 between inner cover 18 and tabs 22. Having the tabs 22 as part of outer cover 12 is also within the scope of the invention. Switch 20 is placed above deployment seam 14 so the deployment of the airbag is not hindered. The contacts of switch 20 are connected to the automobile horn through wires (not shown) and preferably through a detachable connector located in the steering wheel.

In operation, when the operator requires the horn to blow, force is applied to outer cover 12 which deforms and closes the space between outer cover 12 and inner cover 18 thereby causing the contacts of horn switch 20 to close activating the horn. Should horn switch 20 require replacing, outer cover 12 is removed via screws 26 and horn switch 20 is slid out of pocket 23 and the wires (not shown) are disconnected. Switch 20 is then replaced and outer cover 12 is then refastened to the back plate 16.

What is claimed is:

1. An airbag assembly, comprising:
   an airbag;
   an airbag inflator;
   an inner cover housing said airbag between said inner cover and said airbag inflator;
   an outer cover covering said inner cover;
   means defining a pocket, said pocket defining means being between said inner cover and said outer cover formed on one of said covers; and
   a horn switch having relatively displaceable contact portions received in said pocket whereby the contacts are displaced to close said horn switch when a force is applied to said outer cover.

2. An airbag assembly as in claim 1 wherein said means generally defining a pocket comprises a plurality of tabs integrally formed with one of said covers.

3. An airbag assembly as in claim 2 wherein said tabs are formed in said inner cover.

4. An airbag assembly as in claim 3 wherein said tabs formed in said inner cover define three sides of a rectangle.

5. An airbag assembly as in claim 1 wherein said horn switch comprises two separated metallic plates.

6. An airbag assembly as in claim 3 wherein said outer cover is demountably attached to said airbag inflator.

7. A automobile steering wheel assembly comprising:
a steering wheel;
an airbag;
an airbag inflator;
an inner cover housing said airbag between said inner cover and said airbag inflator;
an outer cover covering said inner cover;
means defining a pocket between said inner cover and said outer cover; and
a horn switch having relatively displaceable contact portions received in said pocket whereby the contacts are displaced to close the horn switch when a force is applied to said outer cover.

8. An airbag assembly as in claim 7 wherein said means generally defining a pocket comprises a plurality of tabs integrally formed with one of said covers.

9. A steering wheel assembly as in claim 8 wherein said tabs are formed in said inner cover.

10. A steering wheel assembly as in claim 9 wherein said tabs formed in said inner cover define three sides of a rectangle.

11. An airbag cover for receiving a horn switch having relatively displaceable contact portions comprising:
an inner cover;
an outer cover enclosing said inner cover; and
means defining a pocket for receiving said horn switch between said inner cover and said outer cover including a plurality of tabs integrally formed with one of said covers.

* * * * *